Patented Jan. 6, 1953

2,624,690

UNITED STATES PATENT OFFICE 2,624,690

ADHESIVE COMPOSITIONS COMPRISING POLYMERIZED METHYL METHACRYLATE, AN ESTER OF SALICYLIC ACID AND AN ORGANIC SOLVENT

Sidney Arthur Leader, Hythe, Kent, England, assignor to Portland Plastics Limited, London, England, a British company No Drawing. Application February 4, 1947, Serial No. 726,439. In Great Britain February 19, 1943

Section 1, Public Law 690, August 8, 1946
Patent expires February 19, 1963

7 Claims. (Cl. 167—58)

This invention relates to adhesive compositions.

It is an object of the present invention to provide a liquid or pasty composition suitable for use in the treatment of wounds and the formation of a sterile, germicidal coating for the surgeon's hands, and it is a further object of the invention to produce from such a liquid or pasty composition surgical dressings for the same purpose.

With these objects in view the present invention provides a liquid or pasty composition comprising polymerised methyl methacrylate, an ester of salicylic acid, and a volatile organic solvent with or without a liquid capable of polymerisation. The composition on evaporation of the volatile solvent and the polymerisation of the polymerisable substance (if present), forms a film which is capable of adhering firmly to the human skin.

When adhesion is undesirable, e. g. when the composition is used to coat the surgeon's hands, a coating of talc, petroleum jelly or the like may first be applied to the hands.

If, on the other hand, it is desired to increase the adhesive properties of the composition, a small proportion, for example 1 to 2% by weight, of ester gum may be added to the composition.

The salicylic acid esters which it is preferred to use are methyl salicylate and phenyl salicylate (Salol), and of these I find that phenyl salicylate is the more satisfactory in use.

If desired, a minor proportion of the salicylic acid esters may be replaced by other phenolic derivatives such as thymol or resorcinol. The use of thymol increases the germicidal value of the composition and the elasticity of the film formed on evaporation of the solvent.

In order to facilitate the adherence of the film formed to the skin, an additional plasticiser such as dibutyl phthalate or tricresyl phosphate may be added, it being understood that the salicylic acid esters employed in the composition themselves act as plasticisers. The proportions may be varied to give a predetermined stretch and recovery rate of the film. The film should be sufficiently flexible so as not to break when the patient moves the part covered by the film, for example a joint, and generally a proportion of from 30 to 120 parts, preferably 80 to 100 parts, by weight of the salicylic acid ester or esters per 100 parts of polymethyl methacrylate will be found to be satisfactory.

Furthermore, minor proportions of other acrylate resins not exceeding 10% by weight of the polymethyl methacrylate may be added. Examples of such resins are polystyrene resins and polymerised ethyl methacrylate.

Examples of volatile organic solvents which may be used in the compositions according to the present invention are acetone, methyl ethyl ketone, chloroform and methylene chloride and ethyl chloride, and examples of polymerisable liquids which may be used are monomeric methyl methacrylate or a liquid polymer of methyl methacrylate, i. e. partially polymerised methyl methacrylate, styrene or a liquid polymer thereof, i. e. partially polymerised styrene.

The liquid or pasty compositions of the present invention may also be mounted upon fabric backings to form surgical plasters, or used to impregnate suitably woven fabric to form bandages, and it will be understood that such plasters and bandages are also included within the ambit of the present invention.

The impregnated bandages are particularly suitable for the treatment of varicose veins.

The compositions of the present invention may also include, if desired, a pigment, for example titanium oxide, and dyestuffs.

The compositions and plasters of the present invention are astringent, antiseptic and sedative or analgesic, and have the further advantage that they are insoluble in petroleum hydrocarbons, alkalis or dilute non-oxidising acids, although they may be easily removed by the use of one of the volatile organic solvents referred to above, very hot water or the material known under the registered trade-mark "Lysol."

The following examples, in which the parts are by weight, illustrate how the invention may be carried into effect:

1. 50 parts of phenyl salicylate were mixed with 50 parts of solid polymerised methyl methacrylate and the mixture introduced into a mould which was completely filled and tightly closed, and then heated in boiling water for 30 minutes. The mould was cooled, the contents removed and dissolved in 300 parts of chloroform.

2. 50 parts of phenyl salicylate, 50 parts of solid polymerised methyl methacrylate and 5 parts of dibutyl phthalate were fused together with stirring until a homogeneous mass was formed which was then cooled and dissolved in 300 parts of methylene chloride.

3. 25 parts of solid polymerised methyl methacrylate, 25 parts of monomeric methyl methacrylate, 50 parts of phenyl salicylate, 5 parts of dibutyl phthalate, 0.25 part of titanium oxide, 0.12 part of benzoyl peroxide and 0.012 part of cadmium red were mixed together and heated under reflux with slow stirring, the temperature being about 65° C., and the heating continued for 30 minutes, the temperature being gradually raised to 80° C. A smooth homogeneous liquid which still contained some unchanged monomer was obtained which was then allowed to cool, forming a jelly-like mass which was dissolved in 400 parts of acetone.

4. 15 parts of thymol, 15 parts of phenyl salicylate, 5 parts of dibutyl phthalate, 32.5 parts of monomeric methyl methacrylate, 32.5 parts of solid polymerised methyl methacrylate, 0.2 part of titanium oxide, 0.1 part of benzoyl peroxide and 0.012 part of cadmium red were mixed together and heated at 60° C. with slow stirring until a smooth mass was obtained which gradually thickened. The mass, which still contained some unchanged monomer, was cooled and 400 parts of methyl ethyl ketone were added thereto. When solution was complete a bandage was run through the bath and impregnated with the composition, the bandage then being passed through a drying tunnel to remove the volatile solvent.

5. 5 parts of thymol, 45 parts of phenyl salicylate, 5 parts of dibutyl phthalate, 30 parts of solid polymerised methyl methacrylate and 15 parts of monomeric methyl methacrylate were heated under reflux with slow stirring at a temperature of between 65 and 75° C. to form a homogeneous mass which still contained some unchanged monomer and was then allowed to cool and dissolved in 100 parts of acetone at 45° C. The composition was then poured into trays forming a film upon the top of which a thin linen sheet was placed. The trays were warmed slightly to remove the film with the linen adhering thereto, and the other side of the film was then covered with another sheet of similar linen, and shapes of the desired kind punched from the sheet to form dressings.

6. 20 parts of phenyl salicylate were mixed with 50 parts of solid polymerised methyl methacrylate and 1 part of ester gum and fused together with stirring until a homogeneous mass was formed which was then cooled and dissolved in 300 parts of chloroform.

I claim:

1. A liquid or pasty composition adapted, when applied to the skin or a wound surface and upon evaporation of the solvent constituent thereof, to form a stable, flexible, adhesive, waterproof, germicidal film, said composition consisting essentially of polymerized methyl methacrylate and an ester of salicylic acid selected from the group consisting of methyl salicylate and phenyl salicylate dissolved in a volatile organic solvent selected from the group consisting of acetone, methyl ethyl ketone, chloroform, methylene chloride and ethyl chloride, said ester of salicylic acid being present in a proportion of from 30 to 120 parts by weight per 100 parts by weight of the polymerized methacrylate.

2. A composition according to claim 1 in which the ester of salicyclic acid is present in a proportion of from 80 to 100 parts by weight per 100 parts by weight of the polymerized methacrylate.

3. A liquid or pasty composition adapted, when applied to the skin or a wound surface and upon evaporation of the solvent constituent thereof, to form a stable, flexible, adhesive, waterproof, germicidal film, said composition consisting essentially of polymerized methyl methacrylate and an ester of salicylic acid selected from the group consisting of methyl salicylate and phenyl salicylate dissolved in a volatile organic solvent selected from the group consisting of acetone, methyl ethyl ketone, chloroform, methylene chloride and ethyl chloride, and containing not exceeding 10 percent by weight, based on the polymerized methyl methacrylate proportion, of a compound selected from the group consisting of polystyrene resins and polymerized ethyl methacrylate, said ester of salicyclic acid being present in a proportion of from 30 to 120 parts by weight per 100 parts by weight of the polymerized methacrylate.

4. A liquid or pasty composition adapted, when applied to the skin or a wound surface and upon evaporation of the solvent constituent thereof, to form a stable, flexible, adhesive, waterproof, germicidal film, said composition consisting essentially of polymerized methyl methacrylate and phenyl salicylate dissolved in a volatile organic solvent selected from the group consisting of acetone, methyl ethyl ketone, chloroform, methylene chloride and ethyl chloride, said salicylate being present in a proportion of from 30 to 120 parts by weight per 100 parts by weight of the methacrylate.

5. A liquid or pasty composition adapted, when applied to the skin or a wound surface and upon evaporation of the solvent constituent thereof, to form a stable, flexible, adhesive, waterproof, germicidal film, said composition consisting essentially of from 30 to 120 parts by weight of polymerized methyl methacrylate and 100 parts by weight of phenyl salicylate dissolved in chloroform.

6. A liquid or pasty composition adapted, when applied to the skin or a wound surface and upon evaporation of the solvent constituent thereof, to form a stable, flexible, adhesive, waterproof, germicidal film, said composition consisting essentially of from 30 to 120 parts by weight of polymerized methyl methacrylate and 100 parts by weight of phenyl salicylate dissolved in methyl ethyl ketone.

7. A liquid or pasty composition adapted, when applied to the skin or a wound surface and upon evaporation of the solvent constituent thereof, to form a stable, flexible, adhesive, waterproof, germicidal film, said composition consisting essentially of from 30 to 120 parts by weight of polymerized methyl methacrylate and 100 parts by weight of phenyl salicylate dissolved in methylene chloride.

SIDNEY ARTHUR LEADER.

REFERENCES CITED

The following references are of record in the file of this patent:

UNITED STATES PATENTS

| Number | Name | Date |
| --- | --- | --- |
| 2,126,179 | Duggan | Aug. 9, 1938 |
| 2,174,538 | Stoesser et al. | Oct. 3, 1939 |
| 2,214,402 | Carothers | Sept. 10, 1940 |
| 2,348,447 | Bock | May 9, 1944 |

FOREIGN PATENTS

| Number | Country | Date |
| --- | --- | --- |
| 108,659 | Australia | Sept. 26, 1939 |
| 116,889 | Australia | May 6, 1943 |
| 465,789 | Great Britain | May 14, 1937 |
| 550,252 | Great Britain | Dec. 31, 1942 |

OTHER REFERENCES

"Newer remedies" by Coblentz, 1899, p. 119, P. Blakiston's Son & Co., 1012 Walnut St., Philadelphia, Pa Surgery, Gynecology and Obstetrics, vol. 74, February 1942, pages 499–503.